(12) United States Patent
Brandt

(10) Patent No.: US 6,519,085 B2
(45) Date of Patent: Feb. 11, 2003

(54) SCREEN HOLDING MECHANISM

(75) Inventor: Chris W. Brandt, Portland, OR (US)

(73) Assignee: Clarity Visual Systems, Inc., Wilsonville, OR (US)

( * ) Notice: Subject to any disclaimer, the term of this patent is extended or adjusted under 35 U.S.C. 154(b) by 97 days.

(21) Appl. No.: 09/816,557

(22) Filed: Mar. 23, 2001

(65) Prior Publication Data

US 2002/0135537 A1 Sep. 26, 2002

(51) Int. Cl.[7] .................. G03B 21/56; H04N 5/64
(52) U.S. Cl. ............... 359/449; 359/443; 359/460; 348/789; 348/836
(58) Field of Search .................. 359/449, 443, 359/450, 460; 348/789, 836; 248/200

(56) References Cited

U.S. PATENT DOCUMENTS

| 5,548,350 | A | * | 8/1996 | Yamada et al. | ............ 348/839 |
| 5,604,632 | A | * | 2/1997 | Sawai | ............ 359/443 |
| 5,676,441 | A | * | 10/1997 | Takahashi | ............ 353/94 |
| 5,818,639 | A | * | 10/1998 | Furuya | ............ 359/455 |
| 6,081,375 | A | * | 6/2000 | Furuya et al. | ............ 359/460 |

* cited by examiner

Primary Examiner—Christopher Mahoney
Assistant Examiner—Magda Cruz
(74) Attorney, Agent, or Firm—Stoel Rives LLP

(57) ABSTRACT

A screen assembly holding mechanism is provided for multiscreen displays employing an abutted array of substantially identical display devices that each display a subdivided portion of a total image such that together they display the total image. Each display device includes a screen and a Fresnel lens that form a screen assembly. The screen assembly is connected to the display device by the screen assembly holding mechanism. The screen assembly holding mechanism provides a significantly smaller boundary between the display devices than has before been possible and does not significantly interrupt the total image. The screen assembly holding mechanism also allows for differing expansion and contraction rates of the screen and Fresnel lens and substantially lessens the likelihood of either becoming detached from the screen assembly holding mechanism. The screen assembly holding mechanism may include a safety lip that covers an outer edge of the screen for protection against injury.

10 Claims, 2 Drawing Sheets

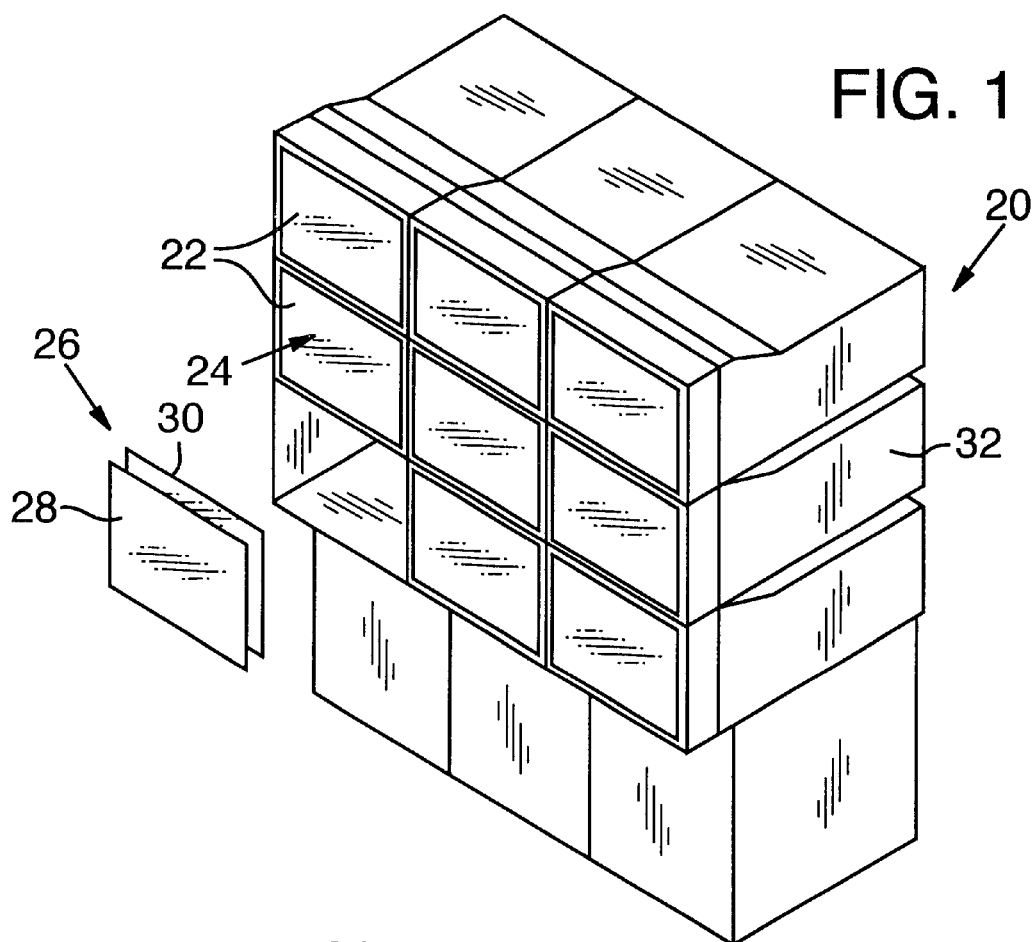
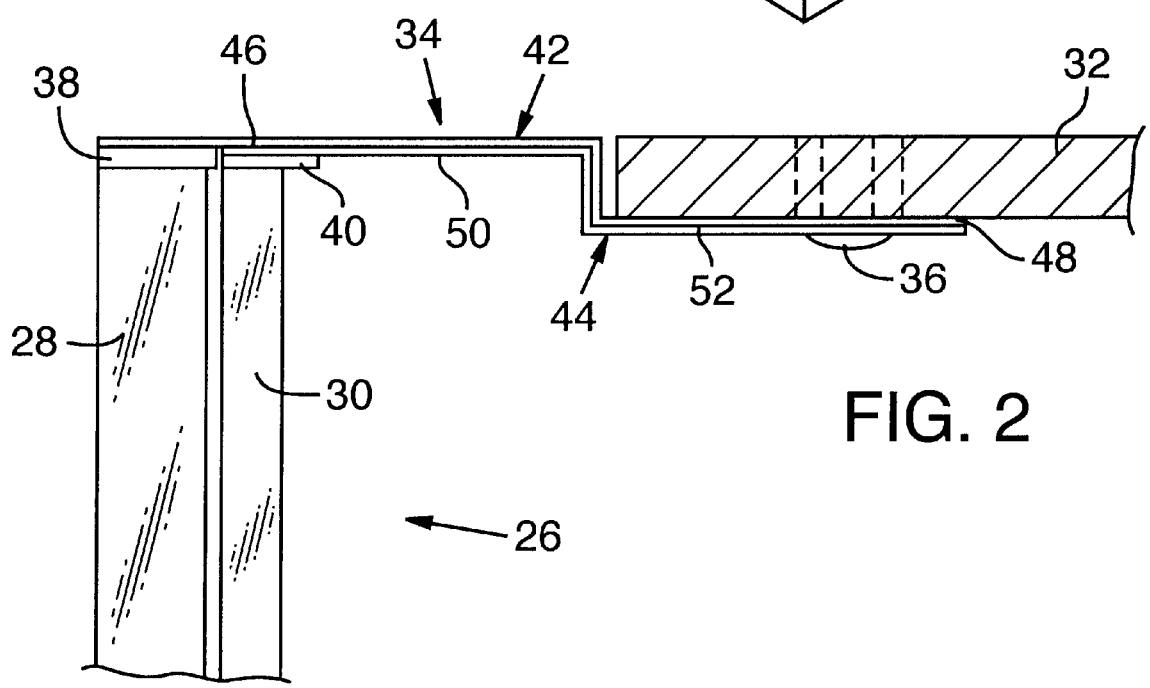

SCREEN HOLDING MECHANISM

TECHNICAL FIELD

This invention relates to video display devices and more particularly to a screen assembly holding mechanism.

BACKGROUND OF THE INVENTION

There are previously known techniques for employing arrays of cathode-ray tube ("CRT") displays in "video walls" and signage applications. Multiscreen displays employ an abutted array of substantially identical display devices that each display a subdivided portion of a total image such that together they display the total image. Each display device typically employs a removable screen assembly comprised of a front screen and rear Fresnel lens which, in some prior multiscreen displays, are attached to the screen frame by a single mullion or bracket having a channel into which the screen assembly is held in place. A portion of the mullion extends from one edge of the front screen across a portion of the surface of the front screen. This arrangement creates an unacceptable width for each mullion of about 3 mm. Since the display devices are arranged in an abutted array the adjacent mullions form a boundary of about 6 mm between the display devices. Because multiscreen displays require that each of the display devices be perceived as part of a whole large display device, it is important to make the boundaries between adjacent display devices appear as inconspicuous as possible. Unfortunately, the human eye is very sensitive to boundary discontinuities, making an acceptably "seamless" multiscreen display very difficult to produce.

One effort to reduce the boundaries between the display devices employs the use of a single mullion to which the screen assembly is attached by a double-sided adhesive strip having a width of about 1/16 in. While this arrangement does reduce the boundary between display devices another problem becomes apparent. The screen and the Fresnel lens may be composed of different materials. For example, the screen may be glass and the Fresnel lens may be acrylic. The screen and the Fresnel lens may be composed of the same material but in either situation certain conditions such as, for example, heat and humidity may cause the screen, Fresnel lens, or both to expand and/or contract. A problem occurs when the screen and the Fresnel lens expand or contract at different rates causing an effect known as "pillowing" which causes poor focus, ghosting, and geometric disturbances. Furthermore, such expansion and contraction may cause one of the screen and the Fresnel lens to detach from the adhesive strip.

Additionally, some glass screens may have ragged outer edges that may cut or injure anyone handling or assembling the screen assembly to the display frame.

Therefore, it is desirable to provide a screen assembly holding mechanism that reduces the boundaries between the display devices while allowing for differing expansion and contraction rates for the screen and the Fresnel lens without becoming detached from the adhesive strip and that protects against injury.

SUMMARY OF THE INVENTION

An object of this invention is, therefore, to provide a screen assembly holding device for displays arranged in an array that provides a substantially seamless boundary between the display devices.

Another object of the invention is to provide a screen assembly holding device that allows for differing expansion and contraction rates for the screen and the Fresnel lens.

A further object of the invention is to provide a screen assembly holding device that minimizes the space between the screen and the Fresnel lens and is mechanically strong.

Still another object of the invention is to provide a screen assembly holding device that includes a safety lip that covers an outer edge of the screen to protect against injury.

The present invention provides a mechanism for holding a screen assembly on a display device used in a multiscreen display employing an abutted array of substantially identical display devices so that each display subdivides a portion of a total image such that together they display the total image. The screen assembly holding mechanism provides for a substantially seamless boundary between adjacent display devices so that the total image appears substantially uninterrupted and free of boundary lines.

A plurality of display devices are arranged in an abutting arrangement so that the screen assembly of each display device forms a substantially continuous projection screen onto which an image is projected. Each screen assembly includes a screen and a Fresnel lens closely adjacent thereto. A screen assembly holding device holds the screen assembly for connection to a screen frame. The screen assembly holding device includes a double mullion arrangement in which the screen and the Fresnel lens are connected to a separate mullion. The screen is attached to a first mullion by a first adhesive strip and the Fresnel lens is attached to a second mullion by a second adhesive strip having a width that is less than the width of the first adhesive strip. The screen and the Fresnel lens are separately attached to one end of the first and second mullions, respectively. The first and second mullions are connected to the display frame by a fastener at an opposite end. Attaching the screen to the first mullion and the Fresnel lens separately to the second mullion allow for differing rates of expansion and contraction of the screen and the Fresnel lens so that neither of them become unattached from their respective adhesive strips.

In another embodiment, the first mullion is the outermost mullion and is attached to the screen. The first mullion includes a safety lip that wraps around its associated adhesive strip and covers an outer edge of the screen at the point of attachment with the adhesive strip to prevent injury from exposure to the sharp outer edge of the screen. The safety lip also holds the screen in place should it become unattached from its associated adhesive strip.

Additional objects and advantages of this invention will be apparent from the following detailed description of preferred embodiments thereof which proceeds with reference to the accompanying drawings.

BRIEF DESCRIPTION OF THE DRAWINGS

FIG. 1 is an isometric view of a multiscreen display with which the screen assembly holding mechanism of the present invention is employed.

FIG. 2 is a partial side assembly view of a screen assembly holding mechanism attached to the screen assembly and the display frame.

DETAILED DESCRIPTION OF PREFERRED EMBODIMENT

Figure 3:
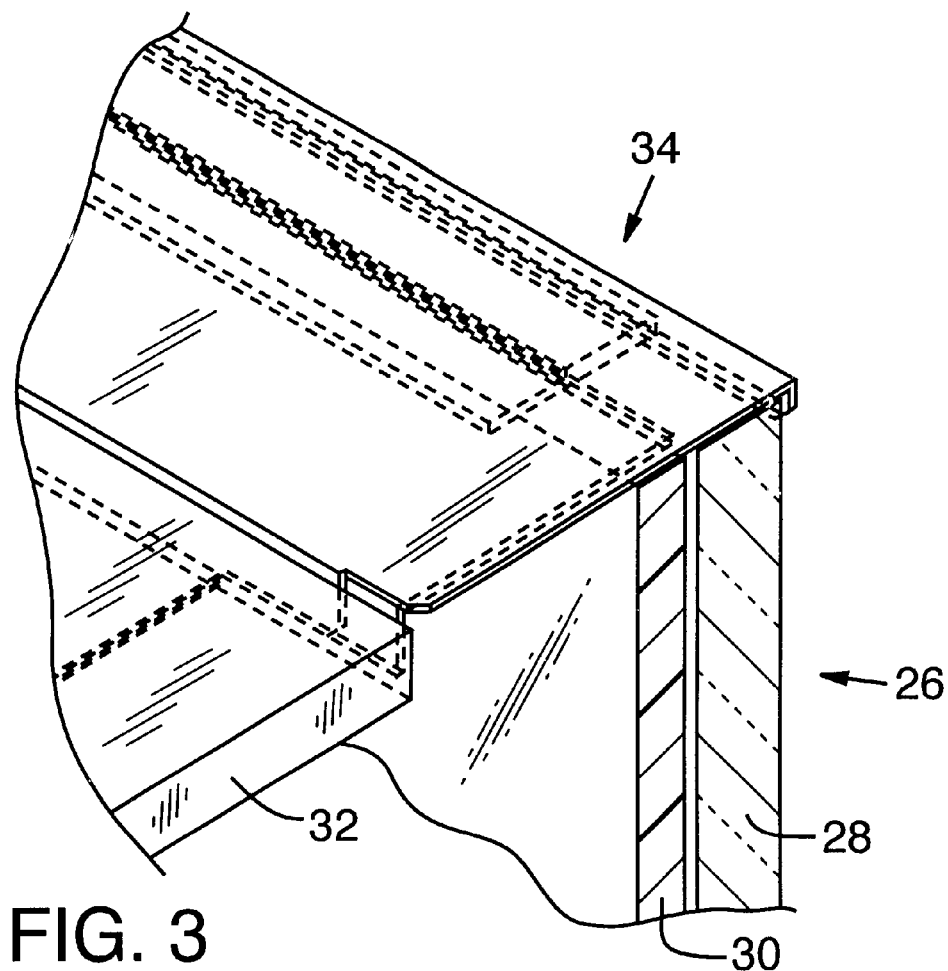
FIG. 3 is an isometric view of the screen assembly holding mechanism of FIG. 2.

FIG. 1 shows a multiscreen display system 20 having a plurality of substantially identical individual display devices 22 having a screen 24 onto which an image is projected or which otherwise displays an image. The display devices 22 are stacked in an array so that each display device 22 shows a subdivided portion of a total image such that together they show the total image. Although nine display devices 22 are shown in FIG. 1 the total number of display devices 22 may vary depending on use and the desired size of the total image. Each display device 22 includes a screen assembly 26 typically formed by a front screen 28 and a back Fresnel lens 30. The screen assembly 26 is held together by a connector and attached to a display frame 32.

Figures 4, 5:
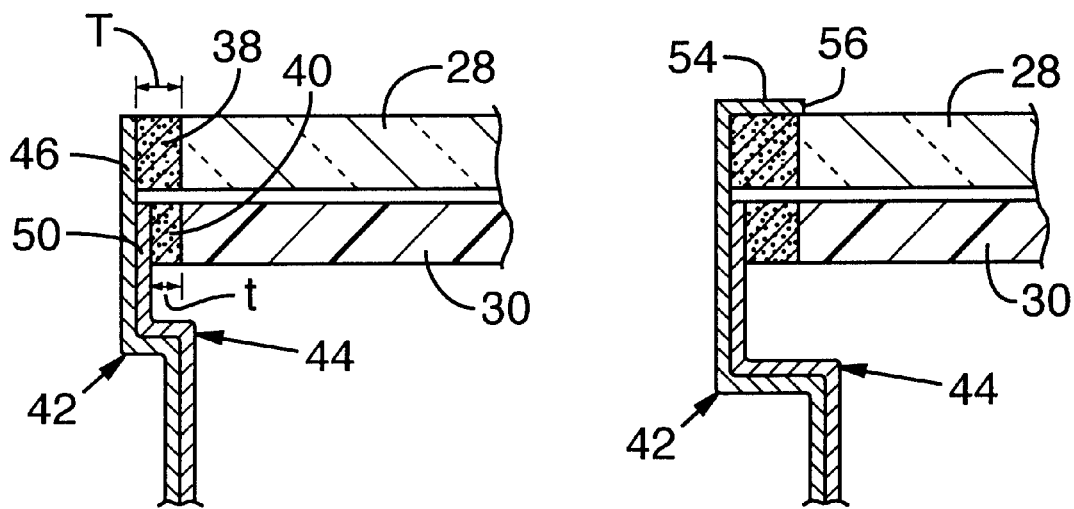
FIG. 4 is an enlarged partial top view of the double mullion attached to the screen assembly.
FIG. 5 is an enlarged partial top view of another embodiment of the double mullion attached to the screen assembly.

Referring now to FIGS. 2–4 the screen assembly 26 and preferred screen holding mechanism 34 are shown. The screen 28 and Fresnel lens 30 are attached separately to the screen holding mechanism 34 which is removably connected to the frame 32 by a threaded fastener 36. The screen 28 and the Fresnel lens 30 are attached to the screen holding mechanism 34 by first and second double-sided adhesive strips 38 and 40, respectively. The screen holding mechanism 34 is preferably in the form of a double mullion arrangement consisting of a first mullion 42 for holding the screen 28 and a second mullion 44 for holding the Fresnel lens 30. The first mullion 42 has a front section 46 for attachment to the screen 28 and a rear section 48 for connection with the display frame 32. Similarly, the second mullion 44 has a front attachment section 50 for attachment to the Fresnel lens 30 and a rear attachment section 52 for connection with the display frame 32. The first and second mullions 42 and 44 are substantially identical except that the front attachment section 46 of the first mullion 42 has a greater length than the front attachment section 50 of the second mullion 44 so that the screen 28 and the Fresnel lens 30 are separated by a small space which is typically between 0.030 in. (0.762 mm) and 0.0500 in. (1.27 mm).

As can be seen most clearly in FIGS. 2 and 4 the screen 28 and Fresnel lens 30 are substantially aligned. In order to achieve this the first adhesive strip 38 preferably has a thickness T that is greater than the thickness t of the second adhesive strip 40 to accommodate the thickness of the front section 50 of the second mullion 44 and the thickness t of the second adhesive strip 40. The thickness of the first and second mullions 42 and 44 and the dimensions of the first and second adhesive strips 38 and 40 may vary depending on certain conditions such as, for example, the thickness of the screen 28 and/or the Fresnel lens 30. However, the preferred thickness of the first and second mullions 42 and 44 is about 0.010 in. (0.254 mm) and thickness of the first adhesive strip 38 is preferably about 0.025 in. (0.635 mm) providing an edge border of about 0.035 in. (0.889 mm). These dimensions result in a boundary of about 0.070 in. (1.778 mm) between two adjacent displays. This boundary width is substantially smaller than in previous display devices and results in a more seamless total image than has been possible in previous arrangements. The second adhesive strip 40 has a preferred thickness of about 0.015 in. (0.381 mm) to allow for the thickness of the second mullion 44 and allow the screen 28 and the Fresnel lens 30 to be substantially aligned.

As seen most clearly in FIG. 4 the first adhesive strip 38 has a width that substantially matches the width of the screen 28 and the second adhesive strip 40 has a width that substantially matches the width of the Fresnel lens 30. The adhesive strips 38 and 40 are attached to the screen 28 and Fresnel lens 30 substantially along their lengths to connect them to the first and second mullions 42 and 44, respectively.

The first and second mullions 42 and 44 are preferably made of 0.010 in. (0.254 mm) stainless steel and are flexible allowing the front sections 46 and 48 to be "springy". The mullions could also be made of aluminum or plastic. This flexibility allows the screen 28 and the Fresnel lens 30 to independently vary their dimensions due to expansion and/or contraction allowing for differing expansion and contraction rates. Since the screen 28 and the Fresnel lens 30 are attached to separate mullions the possibility of either becoming detached from its associated mullion is substantially reduced.

In another embodiment shown in FIG. 5, the first mullion 42 includes a safety lip 54 that wraps around the first adhesive strip 38 and just covers an outer edge 56 of the screen 28 where it attaches to the first adhesive strip 38. This embodiment is advantageous when the screen 28 is made of glass which may have a sharp and ragged outer edge 56 that may result in injury while handling the screen assembly 26. Additionally, the safety lip 54 helps to hold the screen 28 in place should it become detached from the first adhesive strip 38.

Thus, it can be seen that the screen holding mechanism 34 of the present invention overcomes the disadvantages of prior display devices by providing a significantly smaller boundary between the display devices than has before been possible and does not significantly interrupt the total image. The screen holding mechanism 34 also allows for differing expansion and contraction rates of the screen 28 and Fresnel lens 30 without becoming detached from the screen holding mechanism 34. In one embodiment the screen holding mechanism 34 further provides a safety lip 54 that covers the sharp outer edge 56 of the screen 28 for protection against injury.

It will be obvious to those having skill in the art that many changes may be made to the details of the above-described embodiment of this invention without departing from the underlying principles thereof. The scope of the present invention should, therefore, be determined only by the following claims.

What is claimed is:

1. In a multiscreen display including an array of substantially identical display devices that each display a subdivided portion of a total image such that together they display the total image, each display device comprising:

a display frame, a screen for displaying an image, the screen having outer edges, a front surface and a back surface, wherein the image is displayed on the front surface of the screen for viewing, a lens element located adjacent to the screen, the lens element having outer edges, a front surface and a back surface, wherein the front surface of the lens element is located adjacent to the back surface of the screen, and a holding mechanism for connecting the screen and the lens element to the display frame, the holding mechanism comprising a first mullion and a second mullion, the first mullion and the second mullion each having a first end connected to the display frame, the screen being attached to the first mullion and the lens element being attached to the second mullion to allow the screen and the lens element to independently expand and/or contract.

2. The display device of claim 1, in which the screen is attached to the first mullion by a first adhesive strip and the lens element is attached to the second mullion by a second adhesive strip.

3. The display device of claim 2, wherein the first adhesive strip has a width and the second adhesive strip has a width, wherein the width of the first adhesive strip is greater than the width of the second adhesive strip.

4. The display device of claim 1, wherein the first and second mullion each have a second end opposite the first end, wherein the screen is attached to the second end of the first mullion and the lens element is attached to the second end of the second mullion.

5. The display device of claim 1, wherein the first adhesive strip has a surface that is substantially flush with the front surface of the screen, the first mullion including a safety lip that extends over the surface of the first adhesive strip.

6. A screen assembly for a display device, comprising:
   a screen having a front surface, a back surface, and outer edges,
   a lens element having a front surface, a back surface, and outer edges, and
   a holding mechanism for connecting the screen and the lens element to the display device, the holding mechanism comprising a first mullion having a first end and a second opposite end and a second mullion having a first end and a second opposite end, wherein the screen is attached to the first end of the first mullion and the lens element is attached to the first end of the second mullion so that the screen and the lens element are closely adjacent, the second end of the first mullion and the second mullion being adapted to connection to the display device.

7. The screen assembly of claim 6, wherein the screen is attached to the first mullion at an outer edge of the screen and the lens element is attached to the second mullion at an outer edge of the lens element.

8. The screen assembly of claim 7, wherein the screen is attached to the first mullion by a first adhesive strip and the lens element is attached to the second mullion by a second adhesive strip.

9. The screen assembly of claim 8, wherein the first adhesive strip has a width and the second adhesive strip has a width, the width of the first adhesive strip is greater than the width of the second adhesive strip.

10. The screen assembly of claim 6, wherein the first mullion includes a safety lip that extends around to overlie the first adhesive strip and the outer edge of the screen.

\* \* \* \* \*